US012739297B2

(12) United States Patent
Casey et al.

(10) Patent No.: US 12,739,297 B2
(45) **Date of Patent: *Sep. 15, 2026**

(54) DISTRIBUTED CONTENT DISTRIBUTION NETWORK

(71) Applicant: CenturyLink Intellectual Property LLC, Denver, CO (US)

(72) Inventors: Steven M. Casey, Littleton, CO (US); Stephen Opferman, Denver, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/886,195

(22) Filed: Sep. 16, 2024

(65) Prior Publication Data

US 2025/0016219 A1 Jan. 9, 2025

Related U.S. Application Data

(63) Continuation of application No. 17/485,917, filed on Sep. 27, 2021, now Pat. No. 12,095,847.

(Continued)

(51) Int. Cl.
*H04L 67/10* (2022.01)
*H04L 43/0852* (2022.01)
(Continued)

(52) U.S. Cl.
CPC .......... *H04L 67/10* (2013.01); *H04L 43/0852* (2013.01); *H04L 45/64* (2013.01); *H04L 61/103* (2013.01)

(58) Field of Classification Search
CPC ..... H04L 67/10; H04L 43/0852; H04L 45/64; H04L 61/103

(Continued)

(56) References Cited

U.S. PATENT DOCUMENTS 8,762,535 B2 * 6/2014 Lyon .................. H04L 67/1008 709/224
9,596,312 B2 * 3/2017 Ahrens ................ H04L 67/568

(Continued)

FOREIGN PATENT DOCUMENTS

WO WO-0217082 A1 * 2/2002 ......... G06F 16/9574

OTHER PUBLICATIONS

International Preliminary Report on Patentability, dated Apr. 6, 2023, Int'l Appl. No. PCT/US2021/052169, Int'l Filing Date Sep. 27, 2021; 12 pgs.

(Continued)

*Primary Examiner* — Ruolei Zong

(57) ABSTRACT

Examples of the present disclosure relate to a distributed CDN comprised of CDN nodes that each have a compute engine and a data store. Compute engines may be used to execute software associated with computing functionality of the distributed CDN and may be reconfigured according to changing conditions to adapt computing functionality to current or expected demand. Nodes may communicate with one another via an overlay network. A node may determine whether it should process a request or generate a route via the overlay network to the remote node, thereby enabling the remote node to process the request. In another example, a node may receive a request for a compute resource that is not currently provided by the node. The compute engine of the node may be reconfigured to provide the compute resource, thereby enabling the node to service the request rather than redirect the request to a different node.

12 Claims, 8 Drawing Sheets

Related U.S. Application Data

(60) Provisional application No. 63/084,061, filed on Sep. 28, 2020.

(51) Int. Cl.
*H04L 45/64* (2022.01)
*H04L 61/103* (2022.01)

(58) Field of Classification Search
USPC .......................................................... 709/201
See application file for complete search history.

(56) References Cited

U.S. PATENT DOCUMENTS

| | | | | |
|---|---|---|---|---|
| 9,871,850 | B1 * | 1/2018 | Brandwine | H04L 67/10 |
| 9,979,602 | B1 * | 5/2018 | Chinnakannan | H04L 47/803 |
| 10,015,243 | B2 * | 7/2018 | Kazerani | H04L 43/0852 |
| 10,033,627 | B1 * | 7/2018 | Howard | H04L 43/16 |
| 10,593,009 | B1 * | 3/2020 | Surani | G06T 1/20 |
| 2012/0023530 | A1 * | 1/2012 | Xia | H04L 67/63 725/109 |
| 2012/0254432 | A1 * | 10/2012 | Roseborough | H04L 67/01 709/226 |
| 2013/0086273 | A1 * | 4/2013 | Wray | G06F 9/5072 709/226 |
| 2014/0259012 | A1 * | 9/2014 | Nandlall | G06F 9/45558 718/1 |
| 2015/0058403 | A1 * | 2/2015 | He | H04L 61/4511 709/203 |
| 2015/0143374 | A1 * | 5/2015 | Banga | G06F 21/00 718/1 |
| 2015/0281113 | A1 * | 10/2015 | Siciliano | G06F 9/5072 709/226 |
| 2015/0381425 | A1 * | 12/2015 | Kansal | G06F 9/505 709/224 |
| 2017/0171344 | A1 * | 6/2017 | Li | H04L 67/1014 |
| 2018/0060129 | A1 * | 3/2018 | Pai | G06F 9/485 |
| 2018/0316746 | A1 * | 11/2018 | Shattil | H04L 67/63 |
| 2021/0211479 | A1 * | 7/2021 | Trim | H04L 65/80 |
| 2021/0286638 | A1 * | 9/2021 | Fan | H04L 43/0852 |

OTHER PUBLICATIONS

International Search Report and Written Opinion of the International Searching Authority, dated Mar. 14, 2022, Int'l Appl. No. PCT/US21/052169, Int'l Filing Date Sep. 27, 2021; 16 pgs.

Invitation to Pay Additional Fees, dated Jan. 18, 2022, Int'l Appl. No. PCT/US21/052169, Int'l Filing Date Sep. 27, 2021; 10 pgs.

* cited by examiner

DISTRIBUTED CONTENT DISTRIBUTION NETWORK

BACKGROUND

A content distribution network (CDN) comprises nodes that are used to provide computing functionality to client devices. However, it is difficult to manage the structure of the CDN when faced with changing demand, both with respect to request volume and type of computing functionality that is requested, among other examples. Such difficulties may be especially evident when using purpose-built nodes within the CDN, which are not necessarily adaptable to different conditions.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure relate to a distributed content distribution network (CDN). The distributed CDN is comprised of CDN nodes, where each CDN node has a compute engine and a data store. The compute engine may be used to execute any of a variety of software, such as virtual machines, containers, and software packages. Accordingly, CDN nodes execute software associated with the computing functionality that is provided by the distributed CDN. Compute engines of the CDN nodes may be reconfigured according to changing conditions in order to adapt the provided computing functionality to current or expected demand, among other examples.

Nodes of the distributed CDN may communicate via an overlay network, such as a VPN. Accordingly, a CDN node may determine whether it should process a CDN request from a client device or, alternatively, direct the CDN request to a remote CDN node. If it is determined that the request should be redirected, the CDN node may generate a route via the overlay network to the remote CDN node, thereby enabling the client device and the remote CDN node to communicate via the overlay network. In another example, the CDN node may receive a CDN request for a compute resource that is not currently provided by the CDN node. The compute engine of the CDN node may be reconfigured to provide the compute resource, thereby enabling the CDN node to service the CDN request rather than redirect the request to a different CDN node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
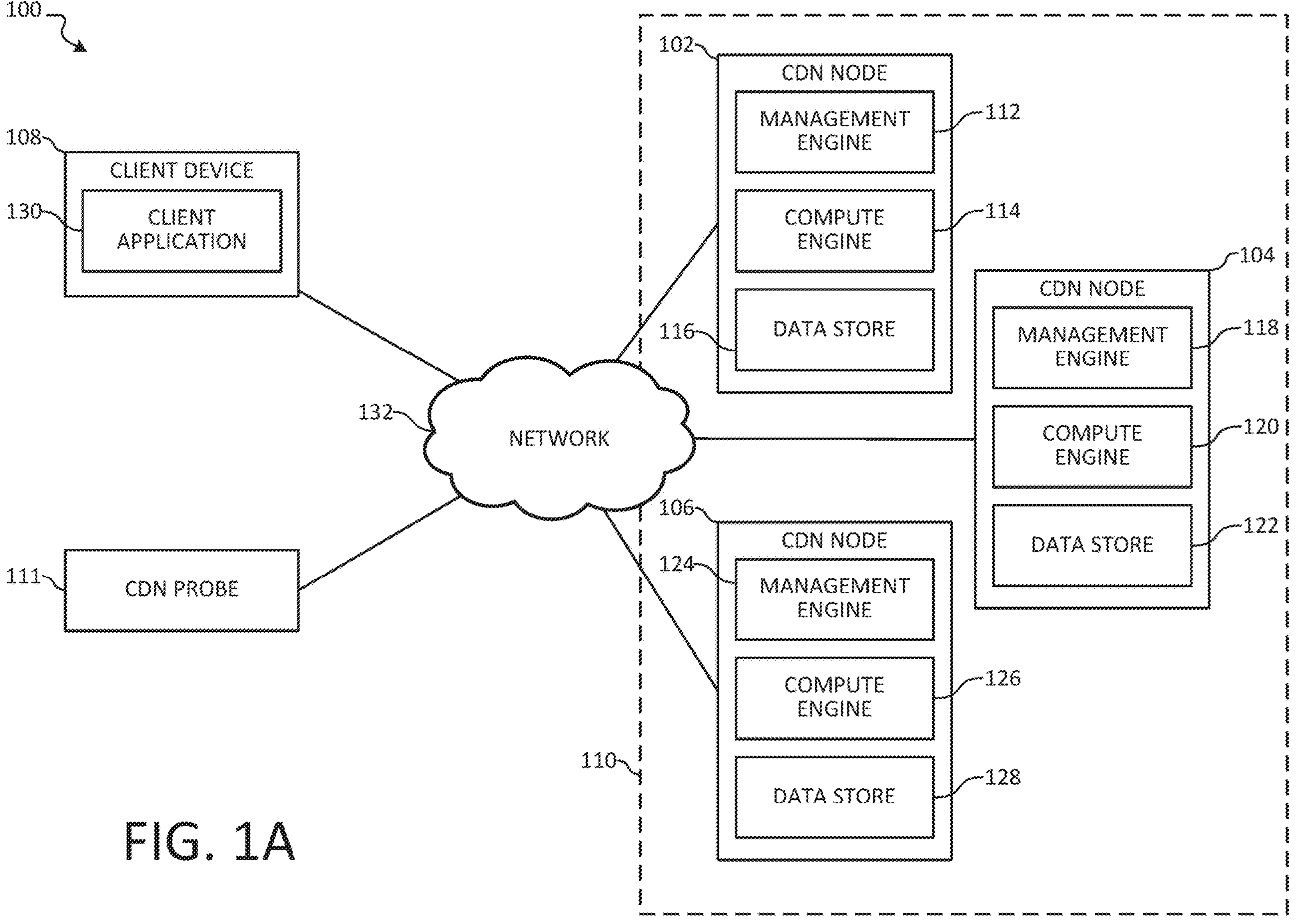
FIG. 1A illustrates an overview of an example system comprising a distributed content distribution network according to aspects of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A content distribution network (CDN) comprises a set of CDN nodes that process requests from client devices. In examples, the CDN provides various types of computing functionality, such as streaming functionality, caching functionality, and computing functionality. However, purpose-built or otherwise specialized nodes may be used (e.g., a streaming node to provide streaming content, a caching node and origin node to provide content delivery, etc.) to provide such computing functionality. Additionally, a CDN may be designed to handle peak expected demand. Using specialized nodes for such a design may result in CDN nodes that are underutilized or bottlenecks may arise depending on the demand experienced by the CDN.

Accordingly, aspects of the present disclosure relate to techniques for a distributed CDN. For example, nodes of the distributed CDN are not specialized but rather can be adapted in response to changing conditions. Additionally, a CDN request need not be handled by a node at which the CDN request was received. Rather, the CDN request may be processed by another CDN node via an overlay network (e.g., a virtual private network between CDN nodes), thereby avoiding the need to redirect the CDN request to a different node. As another example, if the request is one for a compute resource provided by the distributed CDN, the node at which the request was received may be dynamically reconfigured to provide the functionality rather than directing the CDN request to another CDN node. Thus, the distributed CDN aspects described herein offer the ability to repurpose excess computing capacity within the CDN that may otherwise go unused and to direct CDN requests to different CDN nodes within the CDN depending on which node is better-suited to handle such requests.

A CDN is used by a service (e.g., a customer of the CDN) to process requests of client computing devices associated with users of the service. Any of a variety of services may use a CDN according to aspects described herein. Example services include, but are not limited to, a video streaming service, a video game service, a cloud-computing service, or a web application service. For example, a video streaming service may use the CDN to provide streaming content, thereby offloading at least a part of the computational demand associated with providing the video streaming service to the CDN. As another example, the video game service may use the CDN to distribute game updates and/or perform server-side processing (which is also referred to herein as a "compute" resource), among other examples. Thus, it will be appreciated that a service may use a CDN for any of a variety of computing functionality, including, but not limited to, providing content (e.g., one or more files, video and/or audio streams, etc.), server-side processing (e.g., online gaming, cloud computing, web applications, etc.), and audio/video conferencing, among other examples. Thus, a CDN request that is received by a CDN from a client device may be associated with any such computing functionality provided by the CDN. For example, a CDN request may be for streaming content, for content that is distributed via the CDN, or for a compute resource (e.g., where software is executed at a node of the CDN).

As described herein, a node of a CDN comprises a compute engine and a data store. It will be appreciated that such aspects may be provided by or otherwise distributed among any number of devices within the node, including, but not limited to, a server computing device, a storage array, a load balancer, a network switch, a router, or a firewall device, among other examples. In examples, the compute engine comprises at least one central processing unit (CPU), graphics processing unit (GPU), field-programmable gate array (FPGA), and/or application-specific integrated circuit (ASIC). The compute engine may execute one or more virtual machines, containers, and/or software packages, among other software, to provide computing functionality of the CDN according to aspects of the present disclosure. For example, streaming functionality may be provided by a virtual machine or container that buffers streaming content using the data store or, as another example, caching functionality may be provided by a virtual machine or container that stores content from another CDN node (e.g., a node acting as an origin node) in the data store and distributes it to clients accordingly.

In other examples, a CDN node may model network performance, demand characteristics, and other network attributes, such that nodes of the CDN may be reconfigured according to such modeling. A compute engine of the CDN node may be used to provide any of a variety of other functionality including, but not limited to, network switching, request routing, domain name system (DNS) caching and/or resolution, or load balancing. Thus, rather than utilizing specialized nodes, compute engines and data stores of CDN nodes are configurable to provide any of a variety of computing functionality, both with respect to servicing requests from client devices and operating aspects of the distributed CDN. For example, one server computing device of a node may execute a virtual machine providing streaming functionality, while another service computing device of the node may execute a virtual machine that provides, DNS resolution, routing, and/or load balancing functionality. The server computing devices may access a common storage array or may each comprise one or more storage devices, among other examples.

Further, a CDN node need not be owned or physically maintained by the distributed CDN. In examples, a CDN node is provided via computing infrastructure of a third-party, such as a cloud service provider. One or more virtual machine images, containers, and/or software packages may be transmitted to the computing infrastructure and configured to operate as part of the distributed CDN. Additionally, nodes of the distributed CDN may be added or removed dynamically according to associated operational costs. For example, it may be cost effective to utilize nodes operating on third-party computing infrastructure at certain times, while it may be cost effective to utilize CDN-owned computing infrastructure at other times.

In examples, CDN nodes are connected with one another via an overlay network, such as a virtual private network (VPN) via the Internet. Accordingly, CDN nodes may communicate with each other via the VPN and, in some examples, may service requests from client devices via the VPN. As an example, a first CDN node may receive a CDN request (which may be referred to herein as the "local" CDN node). The first CDN node may determine that a second CDN node (a "remote" CDN node) should handle the CDN request instead (e.g., based on one or more performance metrics), and may route the CDN request to the second CDN node via the VPN. Accordingly, the second CDN node and the client device may communicate via the first CDN node and the VPN. Thus, the first CDN node acts as an entry point into the VPN for the client device, such that, from the perspective of the client device, it may appear that the first CDN node is handling the CDN request. It will be appreciated that any number of VPNs or other overlay networks may be used. For example, CDN nodes within a geographic region may be interconnected via a VPN or, as another example, different VPNs may be used depending on the type of CDN requests and associated computing functionality that the nodes are used to provide.

Example performance metrics that may be used to determine whether to route a request to a different CDN node include, but are not limited to, a network response latency (e.g., relating to the one-way or round-trip latency), a compute engine response latency relating (e.g., how long it takes a compute engine of a node to process a request), and/or a software response latency (e.g., how long it takes software executed by the compute engine, such as a virtual machine or container, to process a request). In examples, performance metrics may be combined (e.g., using a weighted average, a sum, etc.) to generate a total response latency. For example, a total response latency performance metric may comprise a sum of the network response latency, the compute engine response latency, and the software response latency. The total response latency may enable the comparison of the ability of a node at which a CDN request was received (using a local latency performance metric, which may omit the network response latency) with the overhead associated with processing a CDN request at another node (e.g., via a VPN, as described above).

A performance metric may be generated based on a historical average, sampled observations, forecasted data (e.g., according to one or more machine learning and/or statistical models), and/or any combination thereof. A performance metric may be calculated contemporaneously with processing a CDN request or may be periodically updated (e.g., according to a predetermined time interval, in response to the occurrence of an event, etc.), among other examples. For example, a latency table or other mapping may be maintained the comprises a total response latency and/or other performance metrics for CDN nodes with which a given CDN node is associated. The latency table may comprise other CDN nodes that are proximate to the CDN (e.g., associated with a given geographic location), having a performance metric above or below a predetermined threshold (e.g., below a predetermined latency), within a certain number of network hops, etc.

As a result of the flexibility provided by the compute engine and data store of CDN nodes, computing functionality provided by the distributed CDN may be dynamically adapted. In examples, log data associated with CDN nodes of the distributed CDN is analyzed according to one or more models. Log data includes, but is not limited to, information relating to system performance (e.g., resource utilization, requests per second, etc.), system errors (e.g., hardware failures, software stack traces, request timeouts, etc.), cache metrics (e.g., hit ratio, miss ratio, etc.), and/or requests from client devices (e.g., a requested resource, a device type, a source Internet Protocol (IP) address, an associated service, etc.). Log data may be generated by CDN nodes, a service that is a customer of the CDN, and/or client devices, among other examples. Thus, it will be appreciated that log data may relate to key performance indicators, metrics, telemetry, fault information, and/or performance information. In examples, at least a part of the log data for a CDN node is generated by one or more server computing devices and/or networking devices, among other constituent devices.

In examples, log data is generated by a CDN probe, which generates traffic (e.g., to or from a CDN node, within the CDN, etc.) to assess the current state of the CDN. For example, a CDN probe may mimic requests typically generated by a client device (e.g., replaying historical requests, simulating requests according to observed patterns for requested computing functionality, etc.). As another example, a CDN probe may generate traffic designed to test various attributes of the CDN. For example, the CDN probe may test a CDN node that uses third-party computing infrastructure to generate log data that is usable to ensure that the CDN node meets certain requirements. In some instances, a CDN probe may be computing device that is separate from a CDN node or may be a device within a CDN node that is distinct from those used to provide the compute engine and data storage aspects described herein. As another example, a CDN probe may be a virtual machine, provided as a container, or as a software package that is executed by a compute engine of a CDN node, among other examples.

Any of a variety of models may be used to analyze log data, including, but not limited to, a machine learning model or a statistical model. For example, log data may be processed to generate a statistical model that may then be used to evaluate subsequent log data. The statistical model may identify one or more thresholds or ranges that are indicative of normal or routine behavior (e.g., relating to resource utilization, requests per second, cache performance, time to process a request, etc.), such that subsequent log data that exceeds such a threshold or range is classified accordingly. As another example, a machine learning model may be generated using annotated log data, thereby enabling the subsequent classification of log data based on the machine learning model. It will be appreciated that example machine learning techniques are described herein and that any of a variety of supervised and unsupervised machine learning techniques may be used.

In some examples, multiple models are used to analyze the log data. For example, results from a set of models are compared to identify a model processing result having the highest confidence. In some instances, model performance is tracked over time, thereby enabling multiple models to be ranked according to one or more model performance metrics (e.g., prediction accuracy, average confidence score, etc.). Further, a model may be associated with a specific service, computing functionality, or other instance in which the model should be used to process log data. Thus, the model need not be used to process log data in all instances, but may instead by associated with one or more specific instances in which the model is well-suited to process such log data.

Model processing results may be stored for subsequent analysis. For example, model processing results may be used to evaluate the strength or effectiveness of a model, to adapt the configuration of one or more nodes of the CDN, and/or to generate reports. As an example, it may be determined that CDN nodes should be added or removed near a given geographic location or that computing functionality provided by a CDN node should be altered (e.g., adding, removing, or changing functionality provided by an associated compute engine) according to forecasted demand. Additional actions include remedying an identified bottleneck (e.g., by adding more server computing devices, by reconfiguring network devices, etc.), restarting or replacing a failing device, and/or reimaging a virtual machine, among other examples. Such operations may be performed automatically by communicating with a node to instruct the node to instantiate or un-instantiate hardware devices and/or virtual machines. Such modeling and orchestration aspects may be performed by a service controller, which may be implemented as a specialized type of CDN node or may be implemented as a virtual machine, container, and/or software package that is executed by a compute engine of a generic CDN according to aspects described herein.

In other examples, computing functionality of a CDN node is reconfigured in response to a received CDN request. For example, a CDN request may be a request for a compute resource, wherein the request comprises an indication as to a compute recipe. For example, the request may specify a Multipurpose Internet Mail Extensions (MIME) type or media type of "compute," or other indication that the request is for a compute resource. The request may further comprise a payload that indicates a robotic process automation (RPA) object or software associated with the compute resource. For example, the indication may comprise a globally unique identifier (GUID), a uniform resource identifier (URI), or other identifier that is usable to identify the compute resource that is associated with the CDN request. It may be determined whether a remote CDN node is usable to process the CDN request (e.g., a node that is already providing the requested compute resource) or whether the local CDN node should be configured to provide the requested resource. The determination may comprise evaluating a set of service rules. A service rule may evaluate one or more conditions, including, but not limited to, resource utilization at the CDN node, a number of requests that have been received for the compute resource within a predetermined period of time, and/or a predetermined schedule. For example, the local CDN node may be configured to process the CDN request if the CDN node has excess capacity, the number of received requests for the resource within the past hour exceeds a predetermined threshold, or if the request was received during business hours. In some instances, service rules may be hierarchical or interdependent, among other examples.

Accordingly, if it is determined to reconfigure the local CDN node, the software associated with the requested compute resource may be executed using the compute engine of the CDN node, thereby reconfiguring the CDN node to process the CDN request. If, however, the evaluation of the set of service rules instead indicates that a remote CDN node should be used to service the CDN request, the CDN request may instead be directed to a remote CDN node accordingly (e.g., by providing a response to the CDN request indicating the remote node, using the overlay network routing techniques described herein, etc.). While such reconfiguration techniques are described as occurring in response to a CDN request, it will be appreciated that similar techniques may be used to proactively reconfigure a CDN node before receiving such a request (e.g., based on forecasted demand, as may be determined by the service controller described above).

FIG. 1A illustrates an overview of an example system 100 comprising a distributed content distribution network according to aspects of the present disclosure. As illustrated, system 100 comprises CDN nodes 102, 104, and 106, client device 108, CDN probe 111, and network 132. CDN nodes 102, 104, and 106, client device 108, and CDN probe 111 are illustrated communicating through network 138. Network 132 may comprise a local area network, a wide area network, one or more cellular networks, and/or the Internet, among other examples. Additionally, CDN nodes 102, 104, and 106 are illustrated within overlay network 110 to indicate that CDN nodes 102, 104, and 106 may further communicate with one another via overlay network 110. For example, the overlay network may be a VPN that is formed over network 132, thereby enabling communication between CDN nodes 102, 104, and 106 that is separate from that of network 132. It will be appreciated that a VPN is provided as an example overlay network and that, in other examples, additional or alternative technologies may be used for inter-node communication. Additionally, CDN probe 111 is illustrated as being external to overlay network 110. In other examples, CDN probe 111 may also connect to the distributed CDN via overlay network 110 or, in other examples, multiple such overlay networks may be used. In such examples, it will be appreciated that a CDN node may be a member of multiple overlay networks.

The distributed CDN in system 100 (e.g., comprising CDN probe 111 and CDN nodes 102, 104, and 106) may provide computing functionality to any of a variety of services, including, but not limited to, a video streaming service, a video game service, a cloud-computing service, or a web application service, among other examples. Accordingly, client device 108 and client application 130 may communicate with the distributed CDN to utilize computing functionality associated with such services. It will be appreciated that, in other examples, certain elements of the example CDN described with respect to system 100 may be provided by a third party and/or functionality described herein with respect to specific elements may be distributed according to any of a variety of other techniques.

Client device 108 may be any of a variety of computing devices, including, but not limited to, a mobile computing device, a tablet computing device, a laptop computing device, or a desktop computing device. In examples, client device 108 communicates with one or more of CDN nodes 102, 104, and 106 via network 132. Client device 108 is illustrated as comprising client application 130, which may be a web browser or an application provided by a service that utilizes the distributed CDN of system 100, among other examples.

CDN node 102 is illustrated as comprising management engine 112, compute engine 114, and data store 116. CDN nodes 104 and 106 comprise similar aspects (e.g., management engine 118, compute engine 120, and data store 122, and management engine 124, compute engine 126, and data store 128, respectively). Accordingly, such aspects are not necessarily re-described below in detail.

Management engine 112, compute engine 114, and data store 116 of CDN node 102 may be provided by one or more devices of CDN node 102, including, but not limited to, a server computing device, a storage array, a load balancer, a network switch, a router, or a firewall device, among other examples. For example, compute engine 114 comprises at least one central processing unit (CPU), graphics processing unit (GPU), field-programmable gate array (FPGA), and/or application-specific integrated circuit (ASIC) of a server computing device of CDN node 102. As described above, compute engine 114 may execute one or more virtual machines, containers, and/or software packages, among other software, to provide computing functionality of the distributed CDN. Similarly, data store 116 may be part of a server computing device or may be a storage array of CDN node 102, among other examples. While management engine 112 is illustrated as being separate from compute engine 114 and data store 116, it will be appreciated that the aspects described below with respect to management engine 112 may be implemented as a virtual machine, container, software package, or other software that is executed using compute engine 114 and/or data store 116.

Management engine 112 initializes and maintains the connection of CDN node 102 to overlay network 110. In examples, management engine 112 transmits and receives control messages to and from other CDN nodes (e.g., CDN nodes 104 and 106) via overlay network 110. For example, an example control message may be part of the Address Resolution Protocol (ARP), such that the forwarding table creation process is used to determine an associated network response latency for CDN nodes with which CDN node 102 communicates. As another example, CDN nodes may also broadcast performance metrics, such as a compute engine response latency and/or a software response latency. In examples, a broadcast message may be used to determine a network response latency in addition to or as an alternative to an ARP control message. Management engine 112 may process such control messages to generate or update a latency table or other mapping that comprises such performance metrics for the CDN nodes. In examples, performance metrics in the latency table are processed according to one or more models in order to generate predicted performance metrics. Thus, it will be appreciated that the request routing aspects described herein may be based on actual, predicted, or historical performance metrics, among other examples.

Management engine 112 may receive a CDN request from client application 130 of client device 108. The CDN request may be for any of a variety of computing functionality provided by the distributed CDN. Management engine 112 determines whether CDN node 102 should process the CDN request based at least in part on the latency table described above. For example, management engine 112 may maintain a local latency performance metric for CDN 102, which may be compared to total response latency performance metrics of the latency table for CDN nodes 104 and 106. Thus, management engine 112 is able to determine whether the CDN request would be more quickly processed by CDN node 102 (e.g., incurring the local latency) or one of CDN nodes 104 or 106 (e.g., incurring the total response latency associated with the remote CDN node).

If management engine 112 determines that CDN node 102 is better-suited to process the CDN request (e.g., CDN node 102 has a lower local latency than the total response latencies of CDN nodes 104 and 106), compute engine 114 and/or data store 116 are used to process the CDN request accordingly. By contrast, if management engine 112 determines that CDN node 104 or 106 are better suited (e.g., one of the remote nodes exhibits a lower total response latency than the local latency of CDN node 102), management engine 112 generates a route to CDN node 104 or 106 via overlay network 110, thereby enabling the remote CDN node to process the CDN request. Thus, CDN node 102 acts as an entry point into overlay network 110 for client device 102, thereby enabling client device 108 to communicate with the remote CDN node and access the requested computing functionality accordingly. Additionally, overlay network 110 enables CDN nodes 102, 104, and 106 to be logically associated even though CDN nodes 102, 104, and 106 may not be geographically associated (e.g., located in the same data center) with one another.

In some examples, CDN node 102 may act as a service controller, such that management engine 112 aggregates and processes log data of constituent devices of CDN nodes 102, 104, and/or 106, client device 108, and/or CDN probe 111. For example, CDN probe 111 may generate traffic and associated log data relating to communications with CDN node 102, 104, and/or 106. Management engine 112 may process the aggregated log data according to one or more models in order to forecast CDN utilization and adapt the configuration of the CDN accordingly. For example, management engine 112 may generate an indication as to a set of computing functionality that should be provided by a CDN. The indicated computing functionality may be associated with specific dates, times, and/or other conditions, such that the structure of the CDN changes based on such conditions. Accordingly, management engine 118 of CDN node 104 and/or management engine 124 of CDN node 106 may manage compute engine 120 and compute engine 126, respectively, to alter the computing functionality that is provided. Management engine 112 may similarly manage compute engine 114.

Management engine 112 may receive a CDN request from client device 108 that is for compute resource. Compute engine 114 may not be currently configured to provide the requested compute resource, such that management engine 112 may evaluate a set of service rules to determine whether to direct the CDN request to another CDN node (e.g., CDN node 104 or 106 via overlay network 110) or to configure compute engine 114 to provide the requested compute resource. As described above, a service rule may evaluate one or more conditions, including, but not limited to, resource utilization at CDN node 102, a number of requests that have been received (e.g., from other client devices) for the compute resource within a predetermined period of time, and/or a predetermined schedule. For example, management engine 112 may configure CDN node 102 to process the CDN request using compute engine 114 if CDN node 102 is determined to have excess capacity, if the number of requests that have been received within the past hour for the compute resource exceeds a predetermined threshold, or if the request was received during business hours.

Figure 1B:
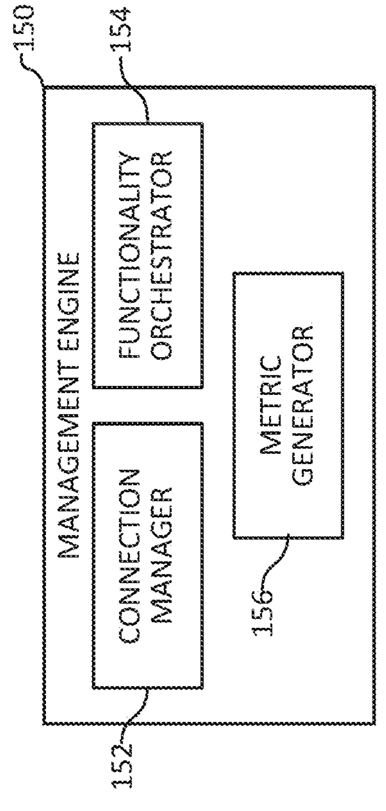
FIG. 1B illustrates an overview of an example management engine for providing and maintaining a distributed content distribution network.

FIG. 1B illustrates an overview of an example management engine 150 for providing and maintaining a distributed content distribution network. Management engine 150 may be similar to management engines 112, 118, and 124 of FIG. 1A. As illustrated, management engine 150 comprises connection manager 152, functionality orchestrator 154, and metric generator 156.

Connection manager 152 manages a connection of a CDN node to one or more overlay networks, such as overlay network 110 in FIG. 1A. In examples, connection manager 110 transmits and receives various control messages associated with an overlay network, including, but not limited to, ARP control messages and broadcasts comprising one or more performance metrics associated with a CDN node. Connection manager 152 may generate a forwarding table comprising a set of CDN nodes reachable via the overlay network. As noted above, a network response latency for each CDN node therein may be determined as part of creating and updating the forwarding table.

In examples, connection manager 152 routes received CDN requests. For example, connection manager 152 receives a CDN request from a client device (e.g., client device 108 in FIG. 1A) and evaluates performance metrics to determine whether the CDN request should be serviced locally at the CDN node at which connection manager 152 is implemented or whether the CDN request should be routed to a remote CDN node. The performance metrics (e.g., a total response latency for a remote CDN node as compared to a local latency for the CDN node at which the CDN request was received) may be generated by metric generator 156, which is discussed below in further detail. If it is determined that a remote CDN node should instead service the CDN request, a route may be generated to an overlay network managed by connection manager 152, or a redirection indication may be provided in response to the CDN request that redirects the client device to the remote CDN node.

In some instances, connection manager 152 may determine to service a CDN request locally but the CDN node may not provide the requested computing functionality (e.g., for a compute resource). Accordingly, connection manager 152 may provide an indication to functionality orchestrator 154 to configure the compute engine (e.g., compute engine 114, 120, or 126 in FIG. 1A) to provide the requested compute resource. Connection manager 152 may make such a determination based at least in part on a set of service rules, as described above.

Functionality orchestrator 154 manages the computing functionality provided by the CDN node, as may be provided by a compute engine (e.g., compute engine 114, 120, or 126 in FIG. 1A) and a data store (e.g., data store 116, 122, or 128). Functionality orchestrator 154 may retrieve a virtual machine image, a container, a software package, and/or other software from any of a variety of sources and store the retrieved software in the data store. For example, the software may be retrieved from another CDN node (e.g., a CDN node acting as an origin node) or from a third-party (e.g., that offers the compute resource being requested by a client device). The software may then be executed from the data store by the compute engine. It will be appreciated that any of a variety of other techniques may be used to distribute software for execution within a distributed CDN according to aspects described herein.

In examples, functionality orchestrator 154 receives an indication from a service controller comprising a set of computing functionality that is to be provided by the CDN node. In some examples, the indicated computing functionality may be associated with specific dates, times, and/or other conditions, such that functionality orchestrator 154 changes the computing functionality provided via the compute engine and/or data store based on such conditions.

Additionally, functionality orchestrator 154 may receive an indication from connection manager 152 that a CDN request for a compute resource has been requested. Accordingly, functionality orchestrator 154 may configure the compute engine to provide the compute resource accordingly. The indication may comprise an identifier (e.g., GUID, URI, etc.) usable to determine which compute resource has been requested and to initialize the compute resource accordingly. In some examples, functionality orchestrator 154 may proactively initialize such a compute resource without first receiving an associated CDN request (e.g., according to a schedule, as may be received from a service controller).

Metric generator 156 maintains a latency table or other data structure that comprises a set of performance metrics for CDN nodes with which the CDN node is associated. In examples, the latency table stores only a total response latency for each CDN node, which may be based on various other performance metrics for a CDN node. For example, the total response latency may be a sum of the network response latency (e.g., as may be determined by connection manager 152 using an ARP control message), the compute engine response latency (e.g., as may be determined from a beacon control message), and the software response latency (e.g., as may be also be determined from the beacon control message) for a given CDN node. Metric generator 156 may also maintain a local latency for the CDN node at which it is located, which may comprise a sum of the compute engine response latency and the software response latency locally at the CDN node.

Metric generator 156 may generate performance metrics based on a historical average, sampled observations, forecasted data (e.g., according to one or more machine learning and/or statistical models) using any of a variety of models, and/or any combination thereof. Metric generator 156 may calculate such performance metrics and/or update a latency table contemporaneously with connection manager 152 processing a CDN request or may periodically perform such operations (e.g., according to a predetermined time interval, in response to the occurrence of an event, etc.), among other examples. The latency table may comprise other CDN nodes that are proximate to the CDN (e.g., associated with a given geographic location), having a performance metric below a predetermined threshold, within a certain number of network hops, etc.

Figure 2A:
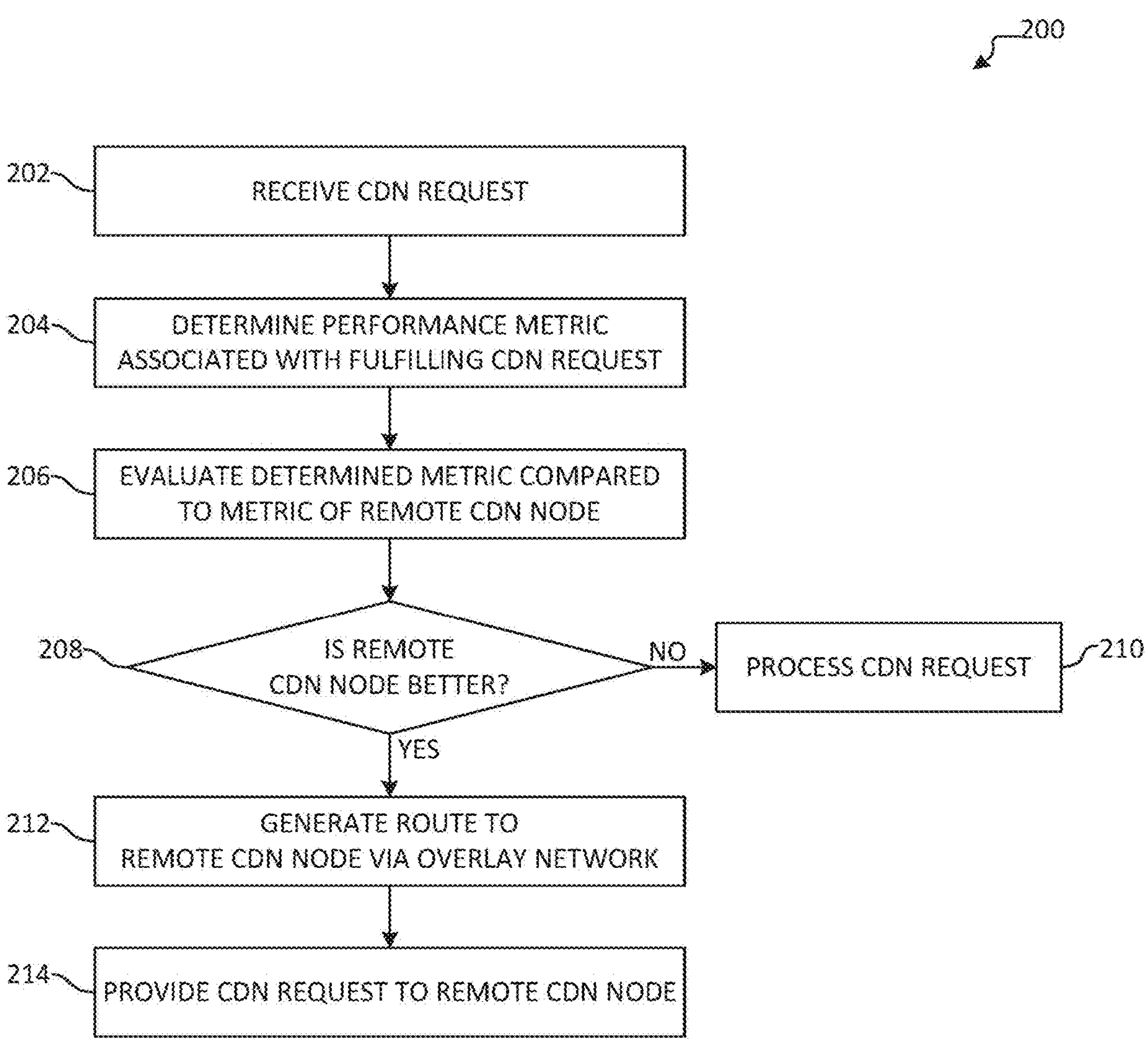
FIG. 2A illustrates an overview of an example method for processing a request by a distributed content distribution network.

FIG. 2A illustrates an overview of an example method 200 for processing a request by a distributed content distribution network. In examples, aspects of method 200 are performed by a CDN node, such as CDN nodes 102, 104, and 106 of FIG. 1A. Method 200 begins at operation 202, where a CDN request is received. The CDN request may be for streaming content, for content that is distributed via the CDN, or for a compute resource (e.g., where software is executed at a node of the CDN). The CDN request may be received from a client device, such as client device 108 in FIG. 1A.

Flow progresses to operation 204, where a performance metric associated with fulfilling the CDN request locally is determined. The performance metric may be one or more of a compute engine response latency, a software response latency, or a local latency that is a combination thereof. In examples, the performance metric is determined by a metric generator, such as metric generator 156 of management engine 150 in FIG. 1B.

Moving to operation 206, the determined performance metric is evaluated as compared to a performance metric of a remote node. In examples, operation 206 comprises evaluating a latency table, as may be generated by a metric generator, such as metric generator 156 of management engine 150 in FIG. 1B. CDN nodes of the latency table may be ranked according to their respective performance metric, such that the top-most ranked CDN node has the most favorable performance metric. For example, if latency is used, the top-most ranked CDN node may have the lowest latency. As discussed above, the performance metric may be one or more of a network response latency, a compute engine response latency, a software response latency, or a total response latency that is a combination thereof. While operation 206 is discussed in the context of evaluating one remote CDN node, it will be appreciated that, in other examples, multiple CDN nodes are evaluated.

At determination 208, it is determined whether the remote CDN node is better-suited to process the CDN request than the local CDN node. For example, if the evaluation at operation 206 determines that the performance metric of the remote CDN node is better than (e.g., less than, in the case of latency) the performance metric of the local CDN node, it is determined than the remote CDN node is better-suited to process the CDN request. It will be appreciated that, in other examples, a determination that the remote CDN node exhibits a performance metric that is more than or higher than that of the local CDN node may instead yield a determination that the local CDN node is better-suited to process the CDN request, as may be the case when the performance metric is tied to processor or memory utilization, among other examples.

Accordingly, if it is determined that the remote CDN node is not better-suited than the local CDN node to handle the CDN request, flow branches "NO" to operation 210, where the CDN request is processed by the local CDN node. Processing the CDN request may comprise providing content from a data store of the local CDN node or providing access to a compute resource, among other examples. Flow terminates at operation 210.

If, however, it is determined that the remote CDN is better-suited than the local CDN node, flow instead branches "YES" to operation 212, where a route is generated to a remote CDN node via an overlay network. In examples, the route is generated by a connection manager, such as connection manager 152 of management engine 150 in FIG. 1B. In examples, the route may comprise an association of the client device from which the CDN was received, the remote CDN node, and an overlay network via which the remote CDN node is accessible. In some instances, a route may already exist via which the client device is able to access the remote CDN node, as may be the case when the client device generates subsequent requests or if it was previously determined to service similar CDN requests using the remote CDN node. While example routing techniques are described, it will be appreciated that any of a variety of other techniques may be used to route a CDN request to a remote CDN node via an overlay network.

At operation 214, the CDN request is provided to the remote CDN node. The CDN request may be forwarded by the local CDN node to the remote CDN node using the overlay network through which the route was generated at operation 212. Accordingly, the client device and the remote CDN node communicate via the local CDN node using the overlay network. Flow terminates at operation 214.

Figure 2B:
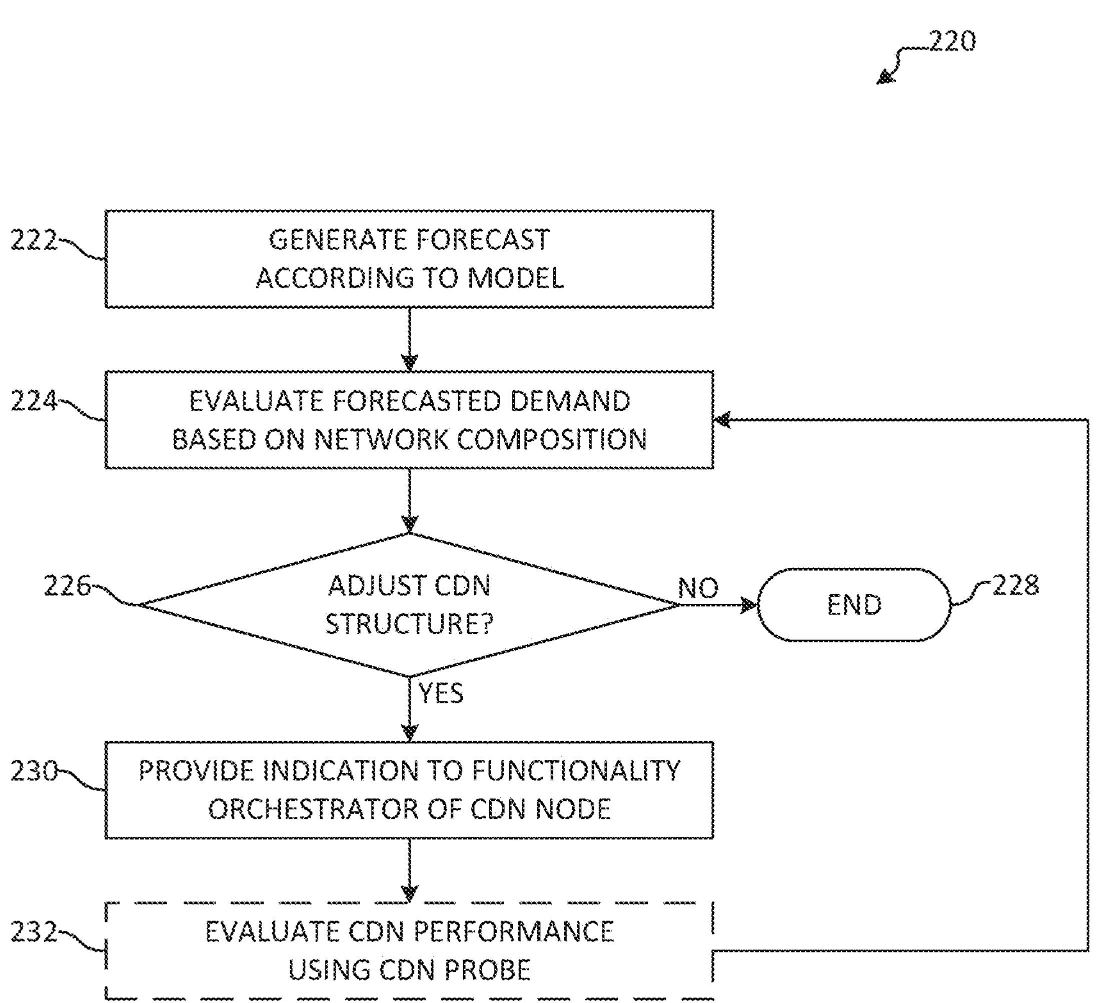
FIG. 2B illustrates an overview of an example method for configuring the composition of a distributed content distribution network according to aspects described herein.

FIG. 2B illustrates an overview of an example method 220 for configuring the composition of a distributed content distribution network according to aspects described herein. In examples, aspects of method 220 are performed by a service controller, which may execute on a CDN node such as CDN node 102, 104, and/or 106 in FIG. 1A. Method 220 may be performed periodically (e.g., weekly, daily, hourly, etc.) or in response to the occurrence of a predetermined event (e.g., utilization exceeding a predetermined threshold, the failure of an existing edge server in a node, etc.), among other examples.

Method 220 begins at operation 222, where a forecast is generated according to a model. In examples, the model used at operation 222 was generated based at least in part on log data associated with a distributed CDN (e.g., as may be generated by a CDN node, a CDN probe, and/or a client device). As described above, any of a variety of models may be used to analyze log data, including, but not limited to, a machine learning model or a statistical model. Additionally, in some examples, multiple models may be used.

Flow progresses to operation 224, where the forecasted demand is evaluated based on the network composition of the CDN. In examples, the evaluation comprises evaluating the number of CDN nodes, computing functionality provided by such CDN nodes, available bandwidth between CDN nodes, and/or available computing capacity at the CDN nodes (e.g., available compute resources, storage capacity, etc.), among other examples. The evaluation may be performed using a predetermined buffer, such that CDN nodes are configured to provide computing functionality that exceeds the forecasted demand by the predetermined buffer. In some instances, the evaluation comprises performing a time-based evaluation or an evaluation based on other conditions, such that the structure of the CDN may change as such conditions occur.

At determination 226, it is determined whether to adjust the structure of the CDN. In examples, the determination comprises comparing the evaluation performed at operation 224 to the existing structure of the CDN to determine whether the CDN is capable of providing the computing functionality that was evaluated. For example, forecasted traffic may be compared to the evaluated computing functionality of one or more CDN nodes. It will be appreciated that any of a variety of other techniques may be used to compare the generated forecast and associated evaluation to the structure of the CDN.

If it is determined not to adjust the structure of the CDN, flow branches "NO" to operation 228, where method 220 ends. If, however, it is determined to adjust the structure of the CDN, flow instead branches "YES" to operation 230, where an indication of the computing functionality from operation 224 associated with the CDN node is provided to a functionality orchestrator of the CDN node (e.g., functionality orchestrator 154 of management engine 150 in FIG. 1B). The CDN node may cause software to execute on an associated compute engine, halt execution of such software, or change configuration of currently executing software, among other examples. As discussed above, the indication may comprise times, dates, and/or other conditions in response to which the CDN node should be reconfigured. While operation 230 is discussed with respect to a single CDN node, it will be appreciated that operation 230 may comprise providing such indications to any number of CDN nodes. Any of a variety of other techniques may be used to adjust the structure of a CDN.

At operation 232, a CDN probe may be used to evaluate CDN performance. The CDN probe may be CDN probe 111 in FIG. 1A. For example, the CDN probe generates traffic to assess the current state of the CDN. For example, a CDN probe may mimic requests typically generated by a client device and/or may generate traffic designed to test various attributes of the CDN. Thus, at operation 232, an indication may be provided to the CDN probe to perform such evaluations. Log data or other information may be received from the CDN probe as part of operation 232. Flow returns to operation 224, where information from the CDN probe may be used to evaluate network composition and adjust CDN structure as described above. Operation 232 is illustrated using a dashed box to indicate that, in some examples, operation 232 may be omitted and method 220 may terminate at operation 230. Thus, flow eventually terminates at either operation 230 or 232.

Figure 2C:
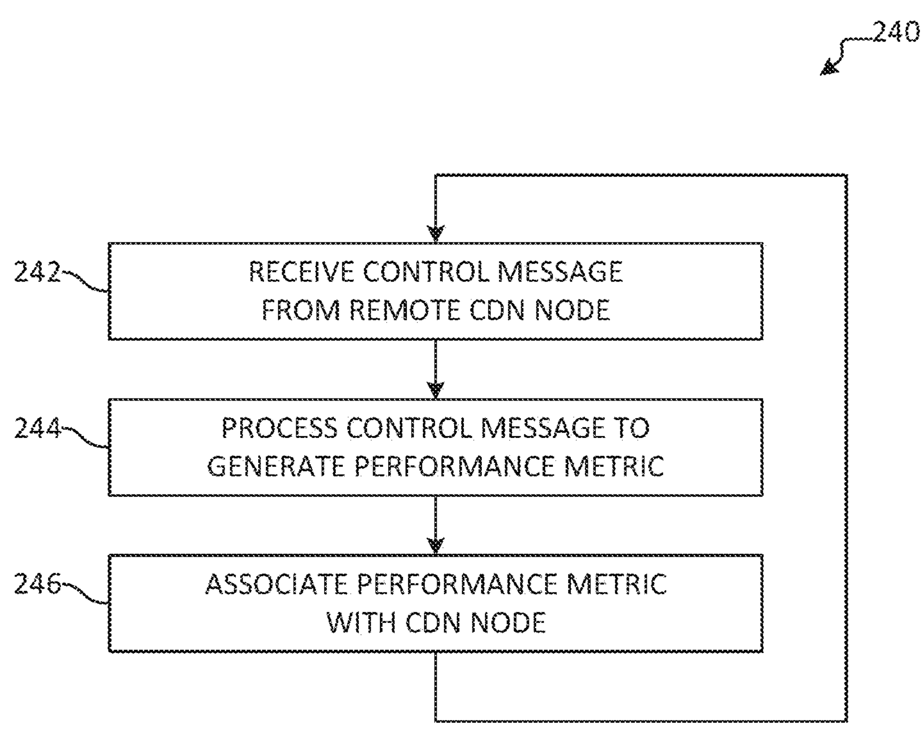
FIG. 2C illustrates an overview of an example method for maintaining node metrics for providing a distributed content distribution network.

FIG. 2C illustrates an overview of an example method 240 for maintaining node metrics for providing a distributed content distribution network. In examples, aspects of method 240 are performed by a management engine, such as management engine 112, 118, or 124 in FIG. 1A, or management engine 150 in FIG. 1B. In some examples, such aspects may be performed by a connection manager and a metric generator, such as connection manager 152 and metric generator 156 in FIG. 1B.

Method 240 begins at operation 242 where a control message is received from a remote CDN node. In examples, the control message is received via an overlay network, such as overlay network 110 in FIG. 1A. The control message may be received by a connection manager, such as connection manager 152 in FIG. 1B. As described above, the control message may be an ARP control message or a beacon from the remote CDN, among other examples.

At operation 244, the control message is processed to generate a performance metric. Aspects of operation 244 may be performed by a metric generator, such as metric generator 156 in FIG. 1B. For example, an ARP control message may be processed to determine a network response latency associated with the remote CDN node. As another example, the beacon control message may comprise a compute engine response latency relating and/or a software response latency of the remote CDN node. In some instances, the beacon comprises a timestamp that is usable to generate a network response latency. Operation 246 may comprise generating a combined performance metric. For example, a total response latency performance metric may comprise a sum of the network response latency, the compute engine response latency, and the software response latency.

Flow progresses to operation 246, where the performance metric is associated with the CDN node. In examples, the association is stored in a latency table that comprises performance metrics for remote CDN nodes with which the local CDN node communications. An arrow is illustrated from operation 246 to operation 242 to indicate that method 240 may be performed periodically in order to maintain an updated latency table. Further, while operations 242-246 are described in the context of processing a control message from a single remote CDN node, it will be appreciated that, in other instances, such processing may be batched for evaluating performance metrics for multiple CDN nodes or a single control message may comprise information usable to generate performance metrics for multiple remote CDN nodes accordingly. Flow may ultimately terminate at operation 246.

Figure 3A:
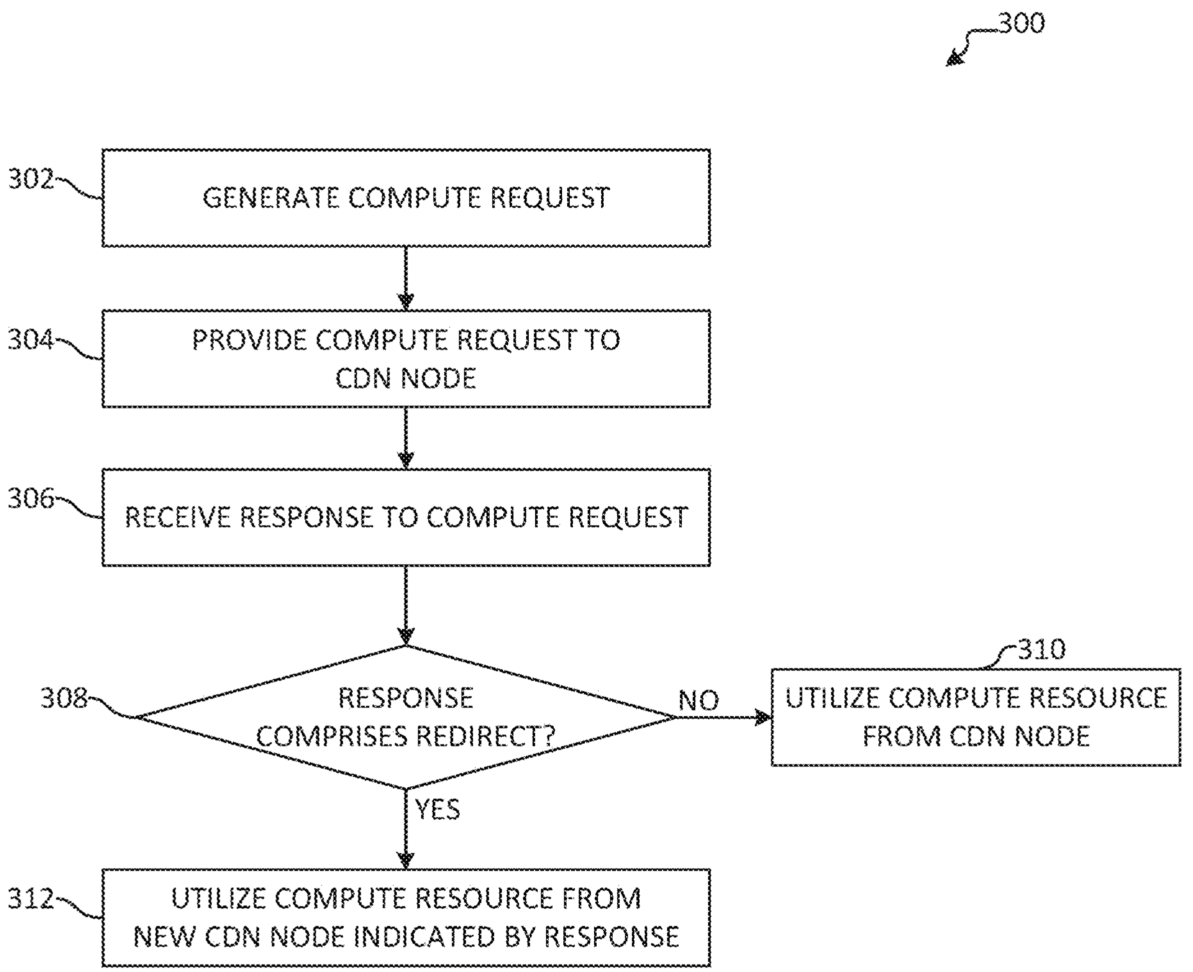
FIG. 3A illustrates an overview of an example method for requesting a compute resource from a content distribution network.

FIG. 3A illustrates an overview of an example method 300 for requesting a compute resource from a content distribution network. In examples, aspects of method 300 are performed by a client application on a client device, such as client application 130 on client device 108 in FIG. 1A. Method 300 begins at operation 302, where a compute request is generated. The compute request is a CDN request for one or more compute resources associated with the CDN. The compute request may specify a MIME type or media type of "compute," or may comprise another indication that the request is for a compute resource. The request may further comprise a payload that indicates an RPA object or software associated with the requested compute resource. For example, the indication may comprise a GUID, a URI, or other identifier that is usable to identify the requested compute resource.

At operation 304, the compute request is provided to a CDN node. In examples the request is provided using a hostname associated with the CDN, which may be resolved to identify a specific CDN node of the CDN. For example, the hostname may be localized in order to identify a CDN node that is geographically proximate to the client device. Flow progresses to operation 306, where a response to the compute request is received from the CDN node.

Flow progresses to determination 308, where it is determined whether the response comprises a redirection indication, as may be the case when a different CDN node has the compute resource that was requested at operation 304. Accordingly, if it is determined that the response comprises a redirection indication, flow branches "YES" to operation 312, where the compute resource is utilized from a new CDN node indicated by the response received at operation 306. Method 300 terminates at operation 312.

If, however, it is determined that the response does not comprise a redirection indication, flow instead branches "NO" to operation 310, where the compute resource is utilized via the node to which the request was provided at operation 304. For example, the CDN node may provide the requested compute resource or, in another example, the CDN node may act as an entry point into an overlay network through which the CDN request was routed to another node, as described above. Flow terminates at operation 310.

Figure 3B:
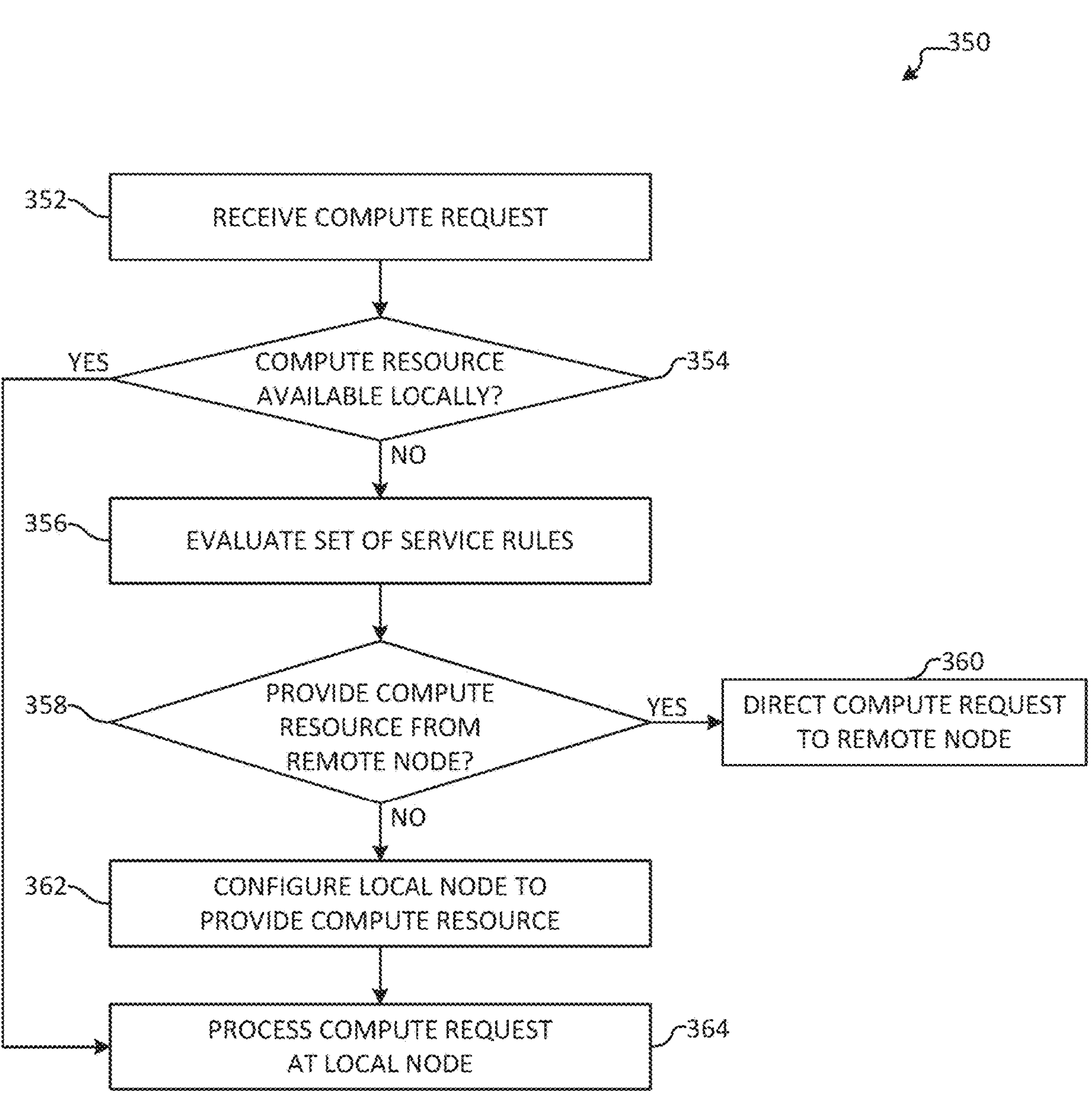
FIG. 3B illustrates an overview of an example method for providing a compute resource from a content distribution network.

FIG. 3B illustrates an overview of an example method 350 for providing a compute resource from a content distribution network. In examples, aspects of method 350 are performed by a CDN node, such as CDN nodes 102, 104, and 106 in FIG. 1A. Method 350 begins at operation 352, where a compute request is received. The compute request is a CDN request for one or more compute resources associated with the CDN. The compute request may specify a MIME type or media type of "compute," or may comprise another indication that the request is for a compute resource. The request may further comprise a payload that indicates an RPA object or software associated with the requested compute resource. For example, the indication may comprise a GUID, a URI, or other identifier that is usable to identify the requested compute resource.

At determination 354, it is determined whether the requested compute resource is available to be provided locally by the CDN node. For example, an identifier associated with the compute request is used to determine whether the requested compute resource is already being executed by a compute engine of the CDN node. If it is determined that the compute resource is available, flow branches "YES" to operation 364, where the compute request is processed at the local CDN node. Aspects of operation 364 are described below in more detail.

If, however, it is determined that the compute resource is not available locally, flow instead branches "NO" to operation 356, where a set of service rules are evaluated. A service rule may evaluate one or more conditions, including, but not limited to, resource utilization at the CDN node, a number of requests that have been received for the compute resource within a predetermined period of time, and/or a predetermined schedule. In some instances, service rules may be hierarchical or interdependent, among other examples.

Accordingly, at determination 358, it is determined whether the compute resource should be provided from a remote node based at least in part on the evaluation at operation 356. If it is determined that the compute resource should be provided using a remote CDN node, flow branches "YES" to operation 360, where the compute request is directed to the remote CDN node. As described above, the compute request may be directed to the remote CDN node using an overlay network via a route that is generated according to aspects of operation 212 in method 200 of FIG. 2A. As another example, the compute request may be directed to the remote CDN node using a redirection indication, wherein the redirection indication causes the client device to communicate with the remote CDN node. Operations 352, 356, 358, and 360 may be performed by a connection manager, such as connection manager 152 of management engine 150 in FIG. 1B. Flow terminates at operation 360.

If, however, it is determined that the compute resource should not be provided from the remote CDN node, flow instead branches "NO" to operation 362, where the local node is configured to provide the compute resource. Aspects of operation 362 may be performed by a functionality orchestrator, such as functionality orchestrator 154 of management engine 150 in FIG. 1B. For example, the CDN node may be configured to provide the requested compute resource if the set of service rules indicate that CDN node has excess capacity, the number of received requests for the resource within the past hour exceeds a predetermined threshold, or if the request was received during business hours. In examples, operation 362 may comprise retrieving a virtual machine image, a container, a software package, and/or other software from any of a variety of sources (e.g., another CDN node, a third-party, etc.) and storing the retrieved software in the data store. The software may then be executed from the data store by a compute engine of the CDN node. At operation 364, the compute request is processed at the local node using the compute engine that is executing the requested computing resource. Flow terminates at operation 364.

Figure 4:
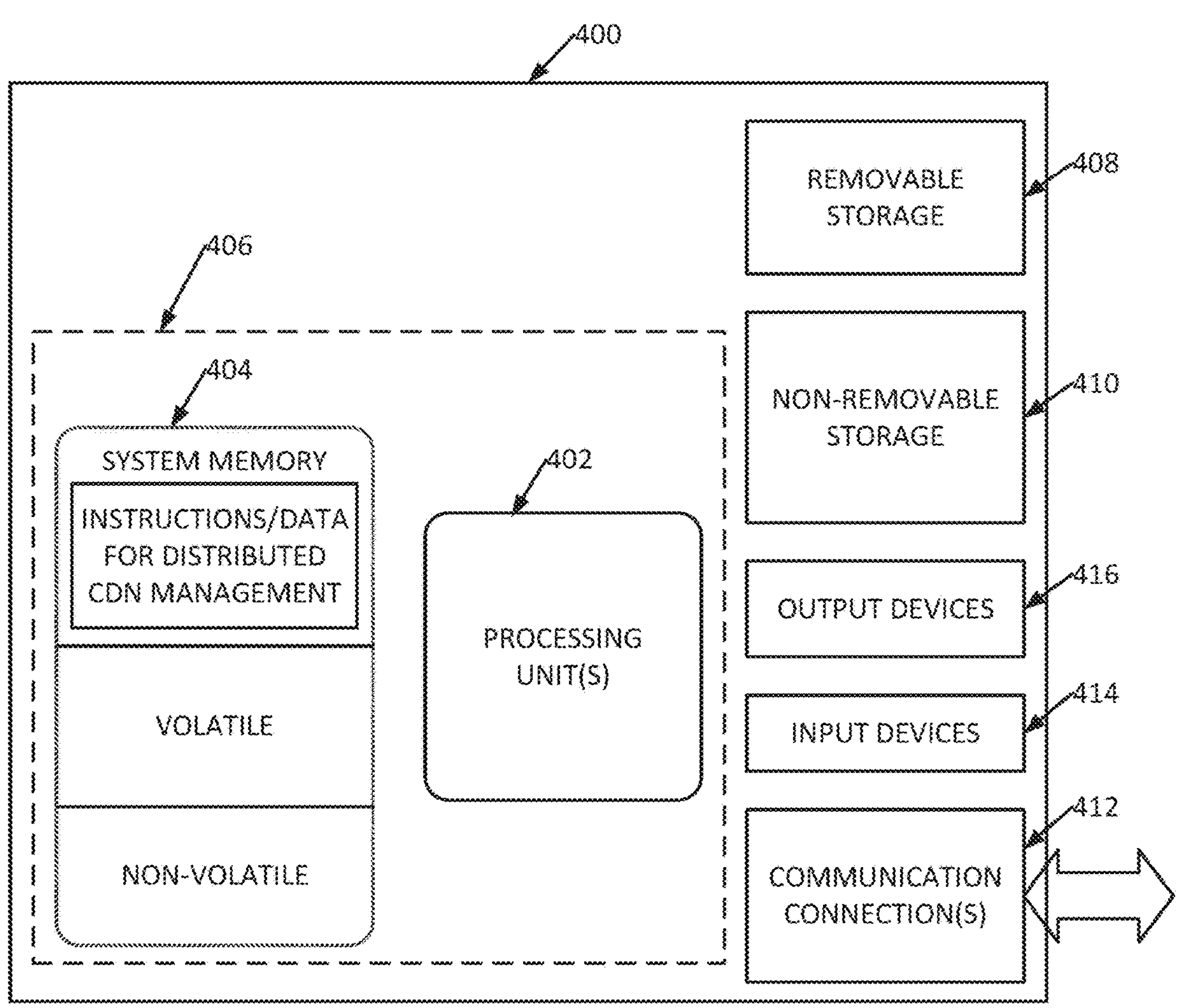
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIGS. 2A-2C and 3A-3B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:

at least one processor; and memory, operatively connected to the at least one processor and storing instructions that, when executed by the at least one processor, cause the system to perform a set of operations, the set of operations comprising:

receiving, by a content distribution network (CDN) node, a request for a compute resource, wherein the CDN node does not provide the compute resource;

determining, using a set of service rules, that a compute engine of the CDN node is to be reconfigured to provide the compute resource; and reconfiguring the compute engine by:

identifying software associated with the requested compute resource;

executing the identified software using the compute engine; and processing the request for the compute resource using the compute engine of the CDN node.

2. The system of claim 1, wherein the set of service rules comprises at least one of:

a service rule based on a time of day;

a service rule based on a day of week; or a service rule based on an amount of requests for the compute resource within a predetermined period of time compared to a predetermined threshold.

3. The system of claim 1, wherein the software associated with the requested compute resource comprises at least one of:

a virtual machine;

a container; or a software package.

4. The system of claim 1, wherein identifying the software associated with the requested compute resource further comprises accessing the software from another CDN node.

5. The system of claim 1, wherein the request for the compute resource comprises an indication that the request is for a compute computing functionality type.

6. The system of claim 5, wherein the request for the compute resource further comprises an indication of the software associated with the requested compute resource.

7. A method for providing a compute resource in a content distribution network (CDN), the method comprising:

receiving, by a CDN node, a request for a compute resource, wherein the CDN node does not provide the compute resource;

determining, using a set of service rules, that a compute engine of the CDN node is to be reconfigured to provide the compute resource; and reconfiguring the compute engine by:

identifying software associated with the requested compute resource;

executing the identified software using the compute engine; and processing the request for the compute resource using the compute engine of the CDN node.

8. The method of claim 7, wherein the set of service rules comprises at least one of:

a service rule based on a time of day;

a service rule based on a day of week; or a service rule based on an amount of requests for the compute resource within a predetermined period of time compared to a predetermined threshold.

9. The method of claim 7, wherein the software associated with the requested compute resource comprises at least one of:

a virtual machine;

a container; or a software package.

10. The method of claim 7, wherein identifying the software associated with the requested compute resource further comprises accessing the software from another CDN node.

11. The method of claim 7, wherein the request for the compute resource comprises an indication that the request is for a compute computing functionality type.

12. The method of claim 11, wherein the request for the compute resource further comprises an indication of the software associated with the requested compute resource.

* * * * *